(12) United States Patent
Duó et al.

(10) Patent No.: US 9,664,069 B2
(45) Date of Patent: May 30, 2017

(54) PANELS OF A FAN OF A GAS TURBINE (71) Applicant: Rolls-Royce Deutschland Ltd & Co KG, Blankenfelde-Mahlow (DE)

(72) Inventors: Pierangelo Duó, Berlin (DE); Karl Schreiber, Am Mellensee (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 161 days.

(21) Appl. No.: 14/843,459

(22) Filed: Sep. 2, 2015

(65) Prior Publication Data
US 2016/0069217 A1 Mar. 10, 2016

(30) Foreign Application Priority Data

Sep. 8, 2014 (DE) .................. 10 2014 217 887

(51) Int. Cl.
*F01D 25/28* (2006.01)
*F01D 5/02* (2006.01)
(Continued)

(52) U.S. Cl.
CPC .............. *F01D 25/28* (2013.01); *F01D 5/02* (2013.01); *F01D 5/027* (2013.01); *F01D 5/12* (2013.01);
(Continued)

(58) Field of Classification Search
CPC .......... F01D 5/22; F01D 25/28; F01D 11/005; F01D 5/02; F01D 5/027; F01D 5/30;
(Continued)

(56) References Cited

U.S. PATENT DOCUMENTS 5,067,877 A 11/1991 Youssef
8,215,910 B2 7/2012 Belmonte et al.
2010/0322772 A1* 12/2010 Hoyland .................. F01D 5/22
416/193 A

FOREIGN PATENT DOCUMENTS

EP 2028375 A2 2/2009
FR 2918409 A1 1/2009
(Continued)

OTHER PUBLICATIONS

European Search Report dated Jan. 28, 2016 for counterpart European Application No. 15182031.3.
(Continued)

*Primary Examiner* — Dwayne J White
*Assistant Examiner* — Justin Pruitt
(74) *Attorney, Agent, or Firm* — Shuttleworth & Ingersoll, PLC; Timothy Klima (57) ABSTRACT An aircraft gas turbine with a fan disc at which fan blades, distributed around the circumference and forming an intermediate space in between each other, are attached, with a sealing disc that is arranged on the back side of the fan disc, and with an inlet cone that is mounted at the front side of the fan disc, as well as with filling elements that are arranged in the intermediate spaces, wherein the inlet cone includes strip-shaped lugs which are configured in one piece with the same and which can be inserted into the intermediate spaces, with their free ends being inserted into a ring groove that is formed at the sealing disc, and in that a filling element is arranged on each strip-shaped lug.

8 Claims, 9 Drawing Sheets

(51) Int. Cl.
    *F01D 5/12*     (2006.01)
    *F01D 11/00*     (2006.01)
    *F02C 7/04*     (2006.01)
    *F01D 5/30*     (2006.01)
    *F01D 5/32*     (2006.01)
    *F01D 9/02*     (2006.01)

(52) U.S. Cl.
    CPC .............. *F01D 5/30* (2013.01); *F01D 5/3015* (2013.01); *F01D 5/323* (2013.01); *F01D 5/326* (2013.01); *F01D 9/02* (2013.01); *F01D 11/00* (2013.01); *F01D 11/008* (2013.01); *F02C 7/04* (2013.01); *F05D 2220/323* (2013.01); *F05D 2230/60* (2013.01); *F05D 2240/128* (2013.01); *F05D 2240/55* (2013.01); *Y02T 50/671* (2013.01)

(58) Field of Classification Search
    CPC ........ F01D 5/3015; F01D 5/323; F01D 5/326; F01D 9/02; F01D 11/00; F01D 55/008; F02D 7/04; F05D 2220/323; F05D 2230/60; F05D 2240/128; F05D 2240/55; Y02T 50/671
    See application file for complete search history.

(56) References Cited

FOREIGN PATENT DOCUMENTS

| | | |
|---|---|---|
| FR | 2960589 A1 | 12/2011 |
| FR | 2988426 A1 | 9/2013 |
| GB | 2363170 A | 12/2001 |
| WO | WO2014051799 A2 | 4/2014 |
| WO | WO2014105668 A1 | 7/2014 |

OTHER PUBLICATIONS

German Search Report dated Apr. 30, 2015 from counterpart App No. 10 2014 217 887.8.

* cited by examiner

PANELS OF A FAN OF A GAS TURBINE

This application claims priority to German Patent Application 102014217887.8 filed Sep. 8, 2014, the entirety of which is incorporated by reference herein.

The invention relates to filling elements of a fan of a gas turbine and in particular to an aircraft gas turbine according to the features of the generic term of claim 1.

In particular, the invention relates to an aircraft gas turbine with a fan disc at which fan blades are attached distributed around the circumference and forming an intermediate space with respect to each other, with a sealing disc that is arranged on the back side of the fan disc, and with an inlet cone which is mounted at the front side of the fan disc, as well as with filling elements that are arranged in the intermediate spaces.

As far as the state of the art is concerned, it may be referred to GB 2 363 170 A. What is shown in the state of the art are constructions in which the filling element (annulus filler) is a separately manufactured structural component that is usually made of aluminum and is suspended on the fan disc by means of hooks. The filling element has the function of forming the radially interior wall of the flow channel in the intermediate spaces between the fan blades and of facilitating an unobstructed flow. Here, the filling elements in particular have to meet the mechanical requirements, for example with regard to the centrifugal forces. Due to their constructional design, manufacture of the filling elements is cost-intensive. Also, the filling elements are relatively heavy. Sealing is effected by means of organic sealing lips, which also have to be separately manufactured. Because of the suspension by means of hooks on the fan disc it is necessary to perform elaborate manufacturing steps on the fan disc itself. In particular if they are manufactured as forged parts, this initially results in the fan disc being considerably heavier and having to be subsequently subjected to a metal cutting process so as to manufacture the hook areas. Overall, this results in structural elements that are very cost-intensive and entail high weights.

The invention is based on the objective to create a fan of an aircraft gas turbine, which avoids the disadvantages of the state of the art and is provided with optimized filling elements, while at the same time allowing for a simple structure as well as easy, cost-effective manufacturability.

According to the invention, the objective is solved by the combination of the features of claim 1, with the subclaims showing further advantageous embodiments of the invention.

Thus, it is provided according to the invention that the inlet cone has strip-shaped lugs which are configured in one piece with the same and which can be inserted into the intermediate spaces between the fan blades. The free ends of the strip-shaped lugs are inserted into a ring groove that is formed at the sealing disc, or they are suspended under a circumferential, ring-shaped projection of the sealing disc. According to the invention, a filling element is arranged on and connected to each of the strip-shaped lugs.

In contrast to the state of the art, with the construction according to the invention the filling elements are no longer mounted on the fan disc, so that the latter does not have to be provided with retaining means or the like. In this way, the weight of the fan disc is considerably reduced. The weight reduction can be up to 10 kg. In addition, the manufacturing costs for the fan disc are considerably reduced.

For mounting the lugs at the back side (with respect to the flow direction), all that is necessary according to the invention is to include a ring groove in the sealing disc, for example. This can be done during the mechanical processing of the sealing disc which is necessary in any case, without any additional elaborate measures being necessary. No additional weight is created by including the ring groove in the sealing disc. The mounting of the filling elements on the front side can be effected by means of the inlet cone, without having to substantially modify its constructional design. This, too, contributes to a considerable cost reduction.

The filling elements are preferably configured as fiber-reinforced molded plastic parts or as molded cast parts. In this way it is possible to adjust the filling elements to the complex geometry of the intermediate spaces—as it is prescribed by the curvature of the fan blades—in a simple manner. Thus, it is possible to manufacture the filling elements so that they fit precisely and additional seals can accordingly be dispensed with. If the organic seals are to be maintained, these can be inserted into the molding tool and can be connected integrally during injection molding or RTM or compression molding.

The lugs of the inlet cone are milled in after the manufacture of the inlet cone. Thus, the inlet cone is manufactured in the usual manner, for example as a fiber-reinforced plastic part, so that no modifications to the basic construction of the inlet cone are necessary in this respect. The filling elements themselves are held in place on the strip-shaped lugs by means of screw connections, rivets or bolt fixings or by means of projections (by using clamping wings). According to the invention it is also possible to clamp them to the strip-shaped lugs or to otherwise anchor them in a form-fit manner. Thus, the filling elements are mounted after the mounting of the inlet cone. This mounting can also be carried out with a quick-release connector in order to be able to replace the filling elements in a simple manner if necessary.

The lugs are preferably configured as bending beams in order to have a sufficient degree of stability against the occurring centrifugal forces.

The filling elements can preferably be made from a fiber-reinforced plastic. Here, glass fibers as well as carbon fibers can be used. Shorter fibers can be used in an injection molding method, while for compression molding longer reinforcing fibers may be applied. Another variant is the manufacture with continuous filament reinforcement by means of the so-called RTM method (Resin Transfer Moulding), where the highest mechanical strengths are achieved at a reasonable cost.

In the following, the invention is described by referring to an exemplary embodiment in connection with the drawing. Herein.

Figure 1:
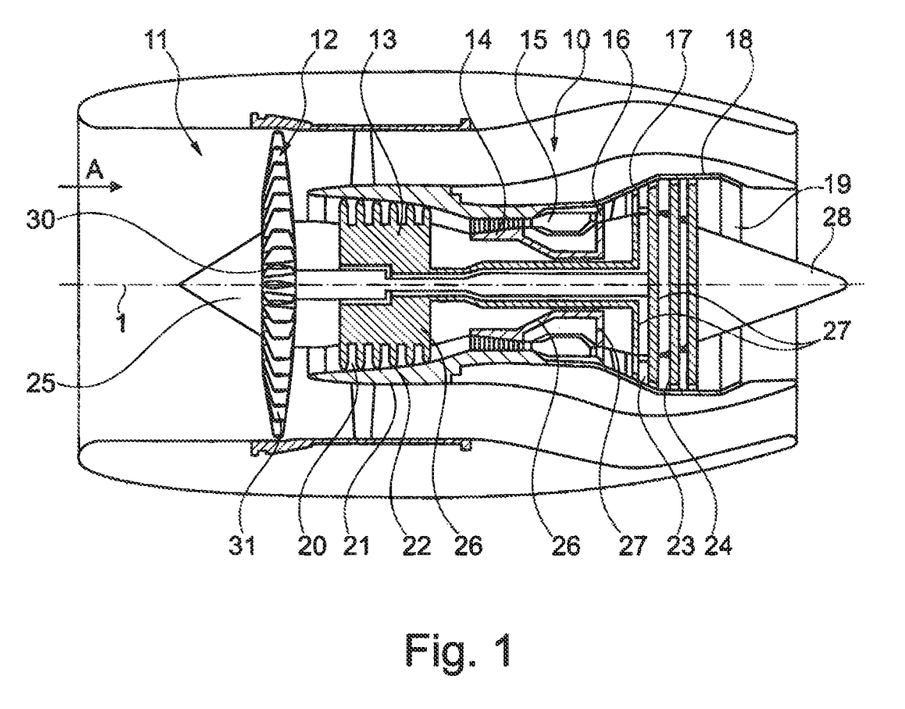
FIG. 1 shows a schematic rendering of a gas turbine engine according to the present invention, FIG. 2 (Prior Art) shows a simplified sectional view of filling elements according to the prior.

The gas turbine engine 10 according to FIG. 1 represents a general example of a turbomachine in which the invention can be used. The engine 10 is embodied in the conventional manner and comprises, arranged in succession in the flow direction, an air inlet 11, a fan 12 that is circulating inside a housing, a medium-pressure compressor 13, a high-pressure compressor 14, a combustion chamber 15, a high-pressure turbine 16, a medium-pressure turbine 17 and a low-pressure turbine 18, as well as an exhaust nozzle 19, which are all arranged around a central engine axis 1.

The medium-pressure compressor 13 and the high-pressure compressor 14 comprise multiple stages, respectively, with each of these stages having an array of fixedly attached stationary guide blades 20 extending in the circumferential direction, which are generally referred to as stator blades and which protrude radially inwards from the core engine housing 21 through the compressors 13, 14 into a ring-shaped flow channel. Further, the compressors have an array of compressor rotor blades 22 that protrude radially outwards from a rotatable drum or disc 26, [and] which are coupled to hubs 27 of the high-pressure turbine 16 or of the medium-pressure turbine 17.

The turbine sections 16, 17, 18 have similar stages, comprising an array of fixedly attached guide blades 23 which are protruding through the turbines 16, 17, 18 in a radially inward direction from housing 21 into the ring-shaped flow channel, and a subsequent array of turbine blades 24 that are protruding externally from a rotatable hub 27. In operation, the compressor drum or compressor disc 26 and the blades 22 arranged thereon as well as the turbine rotor hub 27 and the turbine rotor blades 24 arranged thereon rotate around the engine axis 1.

Figure 2:
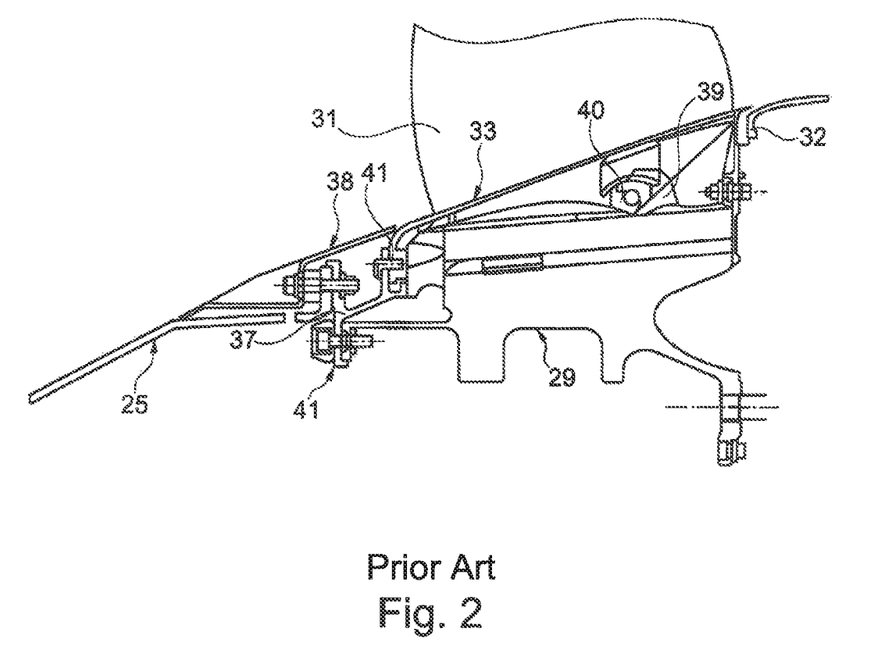

FIG. 2 (Prior Art) shows a filling element according to the prior as well as the attachment of the filling element in a simplified axial section view.

In particular, FIG. 2 shows an inlet cone 25 that is attached to a front retaining ring 37. In order to cover the attachment area, a front ring-like sheathing 38 is provided.

A fan disc 29 carries multiple fan blades which are distributed around its circumference and which form an intermediate space 30 (see FIG. 1). This intermediate space 30 is closed by means of filling elements 33.

A sealing disc 32 is arranged on the back side of the fan disc 29.

The fan disc 29 is provided with a plurality of hooks 39 which are distributed around the circumference and into which attachment hooks 40 are inserted that are configured at the individual filling elements 33. The filling elements can be made of aluminum, for example. The front area of the filling elements 33 is attached at the front retaining ring 37 by means of a screw connection 41 to prevent the hooks 39 and the attachment hooks 40 from disengaging.

Figure 3:
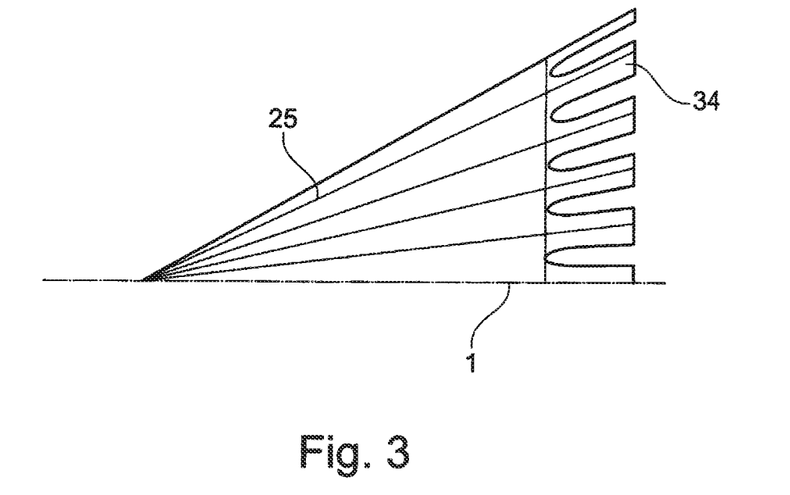
FIG. 3 shows a schematic partial view of a first exemplary embodiment of an inlet cone according to the invention.
Figure 4:
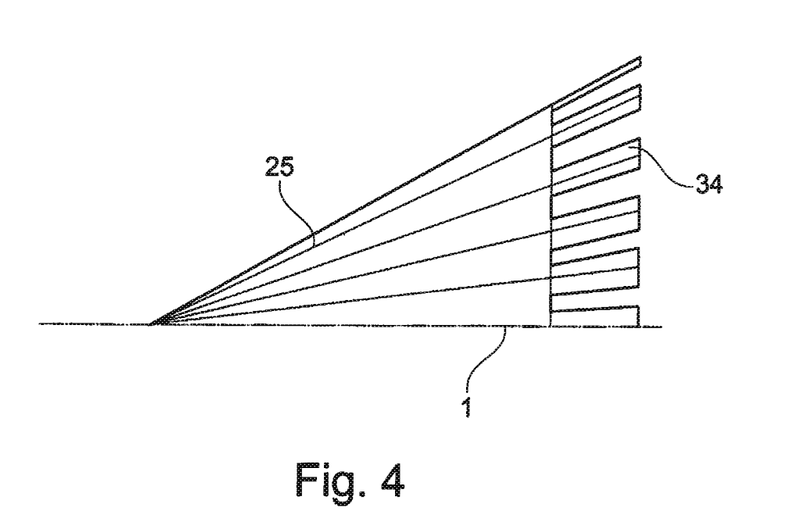
FIG. 4 shows a view, analogous to FIG. 3, of another exemplary embodiment.

FIGS. 3 and 4 respectively show, in a lateral view and in a strongly simplified rendering, an inlet cone 25 that is formed so as to be elongated at its back end (as seen in flow direction) and that has multiple lugs 34 that are evenly distributed around the circumference. These are preferably made by milling them out, and they have dimensions that allow them to be inserted into the intermediate spaces 30 of the fan 12 between the fan blades 31 when the inlet cone 25 is mounted. The two exemplary embodiments show different contours of the lugs 34 with angular or rounded base areas.

Figure 5:
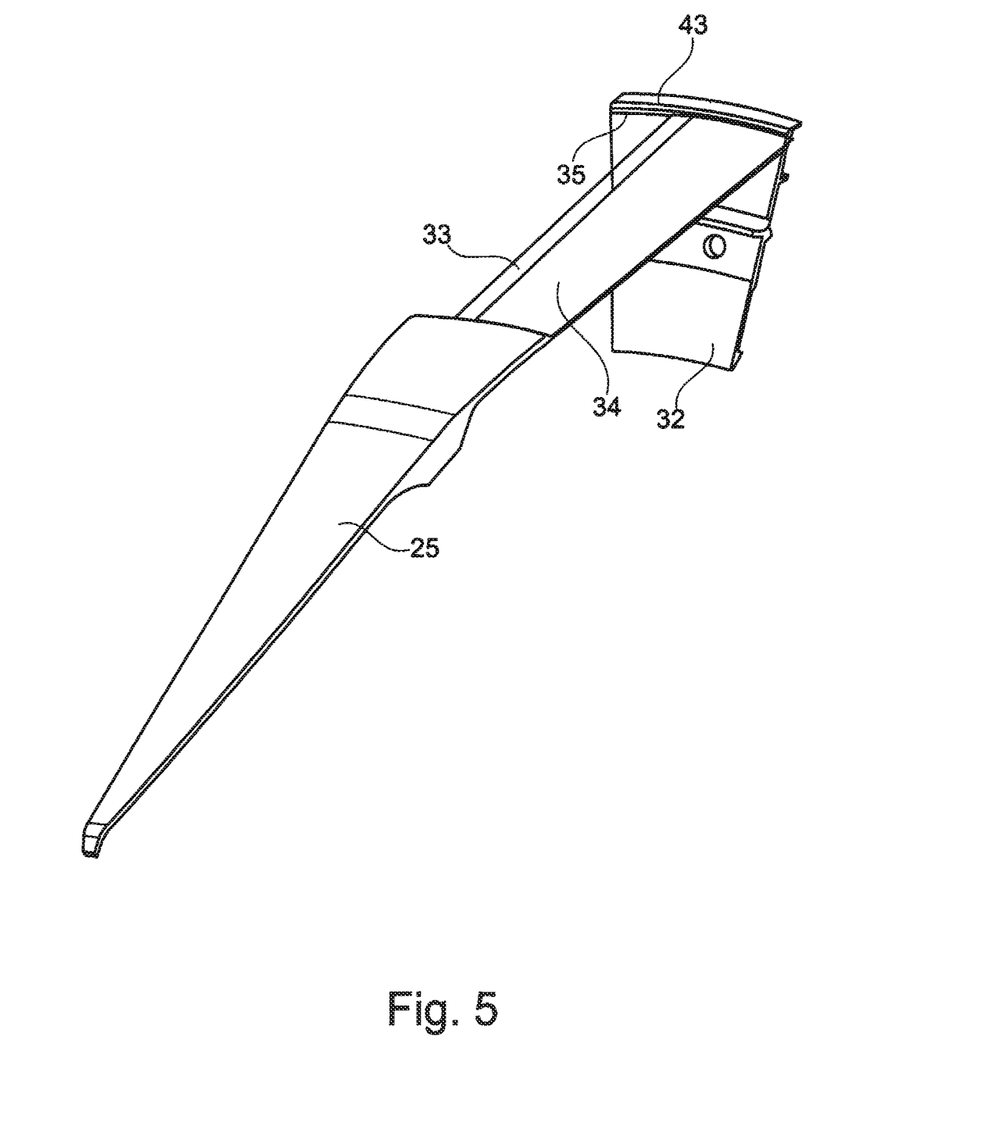
FIGS. 5, 6 show perspective partial views of exemplary embodiments of the inlet cone with strip-shaped lugs and schematically shown filling elements.
Figure 6:
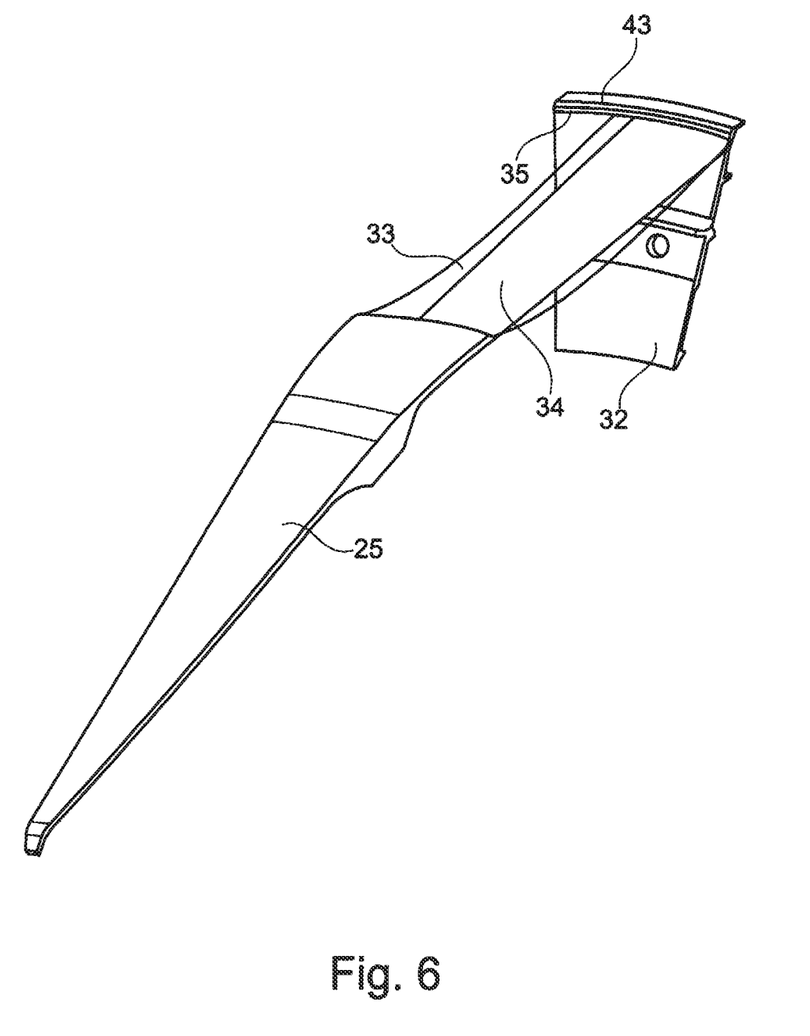

FIGS. 5 and 6 show, in a perspective rendering, parts of the inlet cone 25 comprising the lugs 34 that are inserted into or suspended in a ring groove 35 of a sealing disc 32, as will be further explained in connection with FIG. 7.

Figure 7:
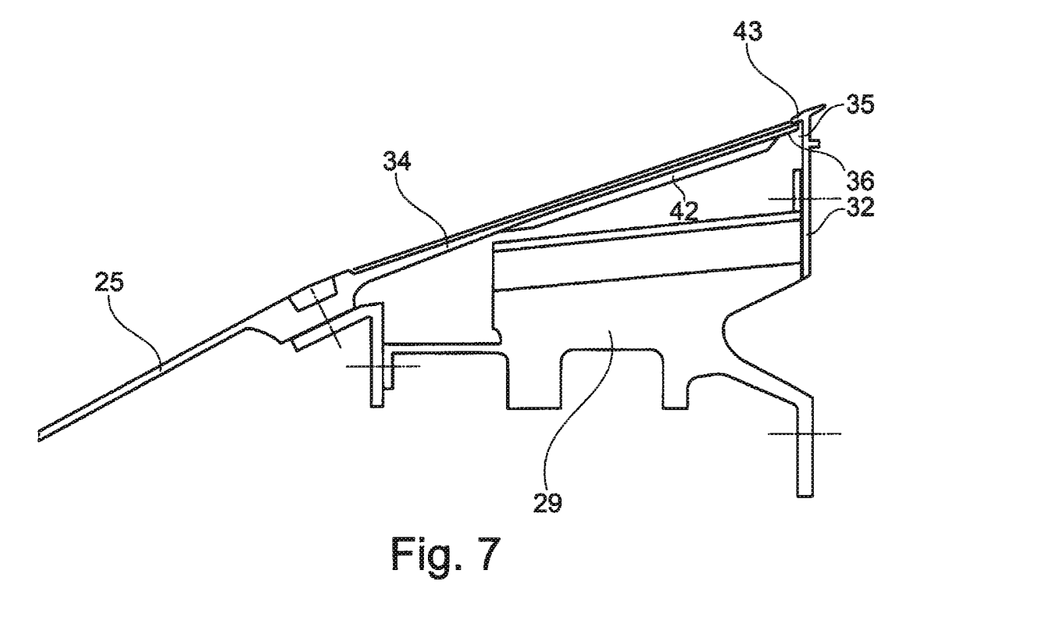
FIG. 7 shows a sectional view, analogous to FIG. 2, of an exemplary embodiment of the invention.

FIG. 7 shows a simplified sectional view, analogous to FIG. 2. In particular, it can be seen here that the strip-shaped lugs 34 are connected in one piece with the inlet cone 25. At their rear end area, as seen in the flow direction, the lugs 34 respectively have an insertion projection 36 that can be inserted into or suspended in a ring groove 35 of the sealing disc 32. The ring groove 35 can be configured as a closed or radial open ring groove, with the ring groove 35 being formed as an annular lip 43 in particular in the latter area.

Figure 12:
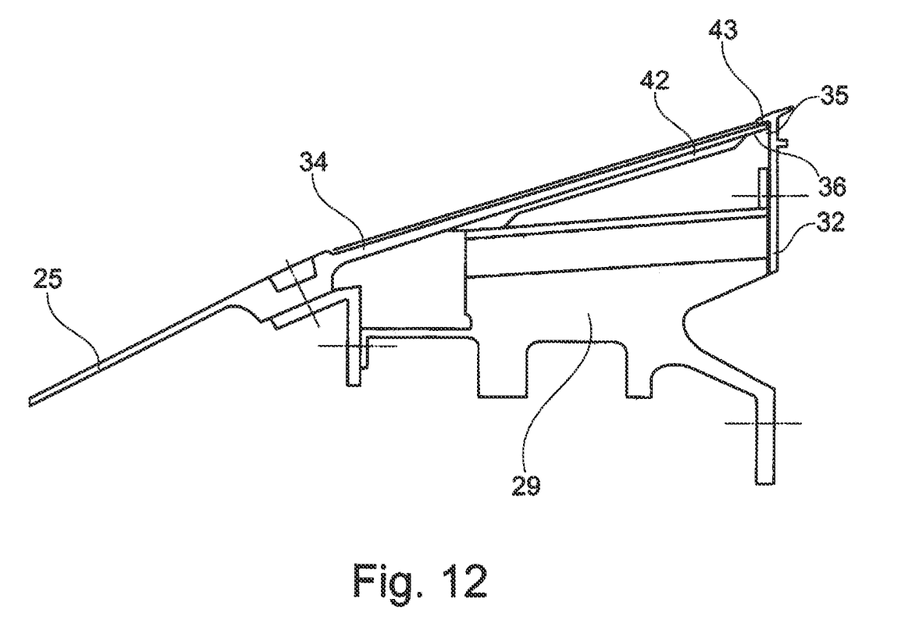
FIGS. 12, 13 show views of other design variants analogous to FIG. 7.
Figure 13:
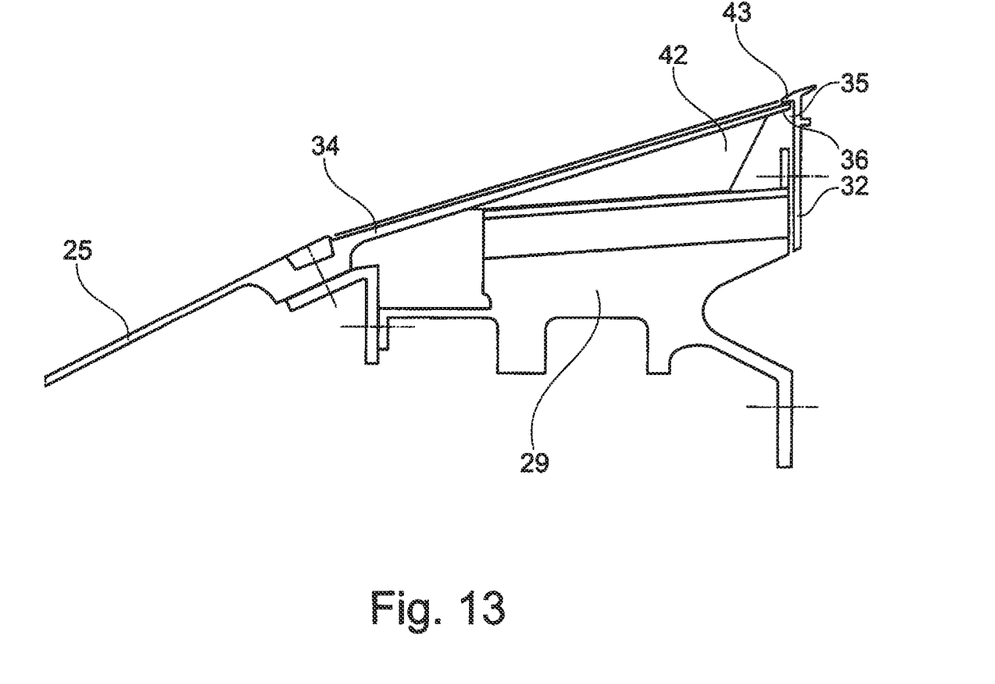

Further, FIG. 7 shows that at their bottom side the lugs 34 are provided with a reinforcement area 42 that extends in a strip-shaped or rib-shaped manner in the longitudinal direction. FIGS. 12 and 13 show design variants for this where the reinforcement area 42 is further thickened, so that it partially or completely abuts the fan disc 29.

Figure 8:
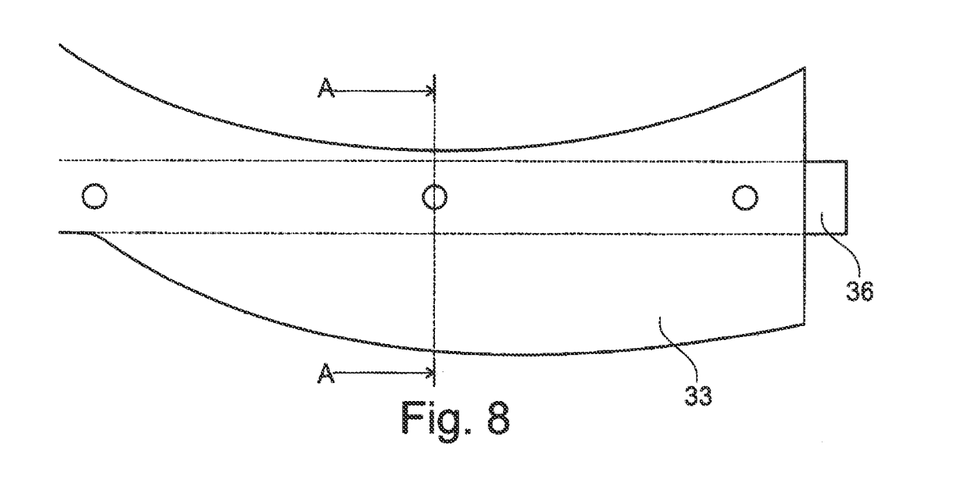
FIGS. 8, 9 show a schematic top view as well as a lateral view of the exemplary embodiment according to FIG. 7, FIGS. 10, 11 show sectional views along the line A-A of FIG. 8, rendering different attachment possibilities of the filling element at the lug.
Figure 9:
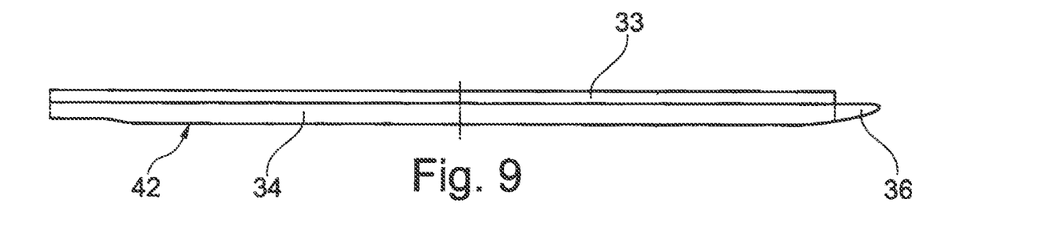
Figure 10:
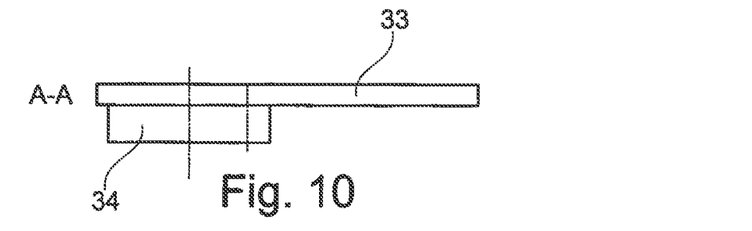
Figure 11:
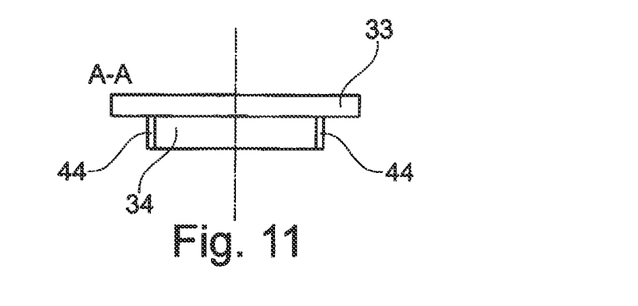

FIGS. 10 and 11 respectively show sectional views along the line A-A of FIG. 8, wherein the dimensional rendering is strongly simplified. From FIG. 10 also follows that the lug 34 can be screwed, riveted or connected by means of another bolt connection or the like to the filling element 33. FIG. 11 schematically shows a rendering in which the filling element 33 can be plugged onto and retained at the lug 34 in a form-fit manner by means of clamps or projections 44 that are laterally affixed to the filling element 33.

FIGS. 12 and 13 show modified exemplary embodiments of the lugs 34 and of the reinforcement areas 42 analogous to FIG. 7. In FIG. 12 there is a smaller distance between the reinforcement area 42 and the fan disc 29, with a front part of the reinforcement area 42 abutting the fan disc 29. In FIG. 13, the reinforcement area 42 abuts the fan disc 29 along its entire length. In this manner, any damage during collision of the parts or in the event of a bird strike is avoided, and deformations of the reinforcement areas are reduced.

Thus, the invention describes a lightweight design of the filling elements 33, where these are not attached to the fan disc 29, but are attached at the lugs 34. Thus, as far as the manufacturing engineering process is concerned, the manufacture of the hooks at the fan disc 29 is no longer required. Further, the fan disc 29 as well as the filling elements 33 can be configured with a strongly simplified geometry, and thus can be manufactured with lower weight and in a more cost-effective manner. As for the sealing disc 32, no or only minor modifications are necessary since all that has to be done is to work in the ring groove 35 or the annular lip. Substantially, no constructional modifications to the inlet cone 29 are required.

Due to the low weight of the filling elements, secondary damage to the gas turbine engine is minor should a failure of the filling elements occur. Another advantage is that the filling elements can be replaced in a simple manner after the inlet cone has been removed.

PARTS LIST 1 engine axis
10 gas turbine engine/core engine
11 air inlet
12 fan
13 medium-pressure compressor (compactor)
14 high-pressure compressor
15 combustion chamber
16 high-pressure turbine
17 medium-pressure turbine
18 low-pressure turbine
19 exhaust nozzle 20 guide blades
21 core engine housing
22 compressor rotor blades
23 guide blades
24 turbine rotor blades
25 inlet cone
26 compressor drum or disc
27 turbine rotor hub
28 outlet cone
29 fan disc
30 intermediate space
31 fan blade
32 sealing disc
33 filling element
34 lug
35 ring groove
36 insertion projection
37 front retaining ring
38 front sheathing
39 hooks
40 attachment hooks
41 screw connection
42 reinforcement area
43 annular lip
44 clamp

The invention claimed is:

1. An aircraft gas turbine, comprising:
a fan disc,
fan blades distributed around a circumference of the fan disc, the fan blades forming an intermediate space in between each other,
a sealing disc arranged on a back side of the fan disc,
an inlet cone mounted at a front side of the fan disc,
filling elements arranged in the intermediate spaces,
wherein the inlet cone comprises strip-shaped lugs which are configured in one piece with the inlet cone and which are inserted into the intermediate spaces, with free ends of the strip-shaped lugs being inserted into a ring groove of the sealing disc, and
a filling element arranged on each strip-shaped lug.

2. The aircraft gas turbine according to claim 1, wherein the strip-shaped lugs are configured as bending beams.

3. The aircraft gas turbine according to claim 1, wherein at the free ends the strip-shaped lugs include an insertion projections for insertion into the ring groove.

4. The aircraft gas turbine according to claim 1, wherein the filling element is connected to the strip-shaped lug in a form-fit manner.

5. The aircraft gas turbine according to claim 4, wherein the filling element is connected to the strip-shaped lug by at least one chosen from bolts, rivets and screws.

6. The aircraft gas turbine according to claim 4, wherein the filling element is clamped to the strip-shaped lug or is slid onto the strip-shaped lug.

7. The aircraft gas turbine according to claim 1, wherein the filling element is a molded plastic part.

8. The aircraft gas turbine according to claim 1, wherein at a bottom side thereof, each strip-shaped lug includes at least one reinforcement area.

* * * * *